Feb. 22, 1949.　　　D. E. SUTTON　　　2,462,788
WORK TABLE FOR BELT GRINDERS AND THE LIKE

Filed April 8, 1946　　　2 Sheets—Sheet 1

INVENTOR
Donald E. Sutton
BY
ATTORNEY

Feb. 22, 1949.  D. E. SUTTON  2,462,788
WORK TABLE FOR BELT GRINDERS AND THE LIKE
Filed April 8, 1946  2 Sheets-Sheet 2
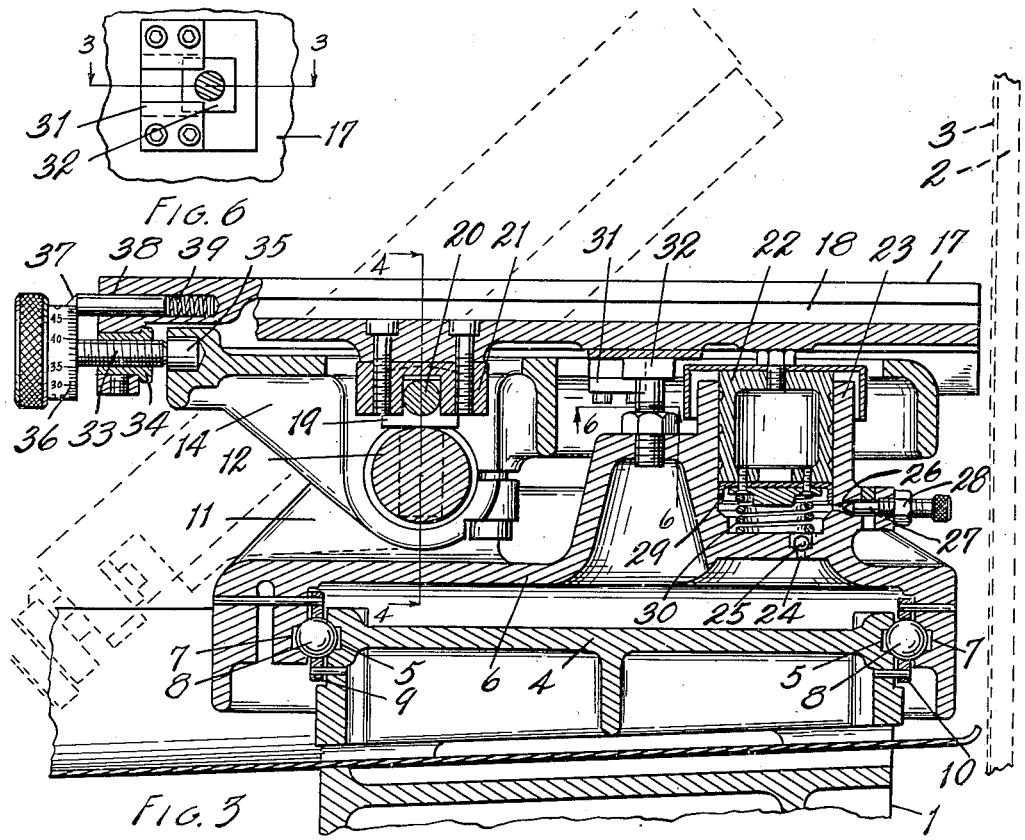
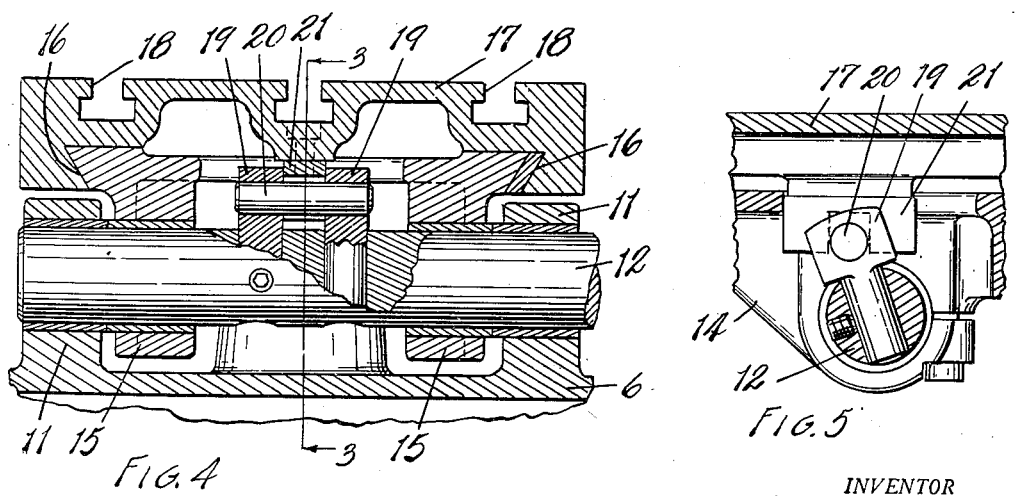
INVENTOR
Donald E. Sutton
BY
ATTORNEYS.

Patented Feb. 22, 1949

2,462,788

UNITED STATES PATENT OFFICE 2,462,788

WORKTABLE FOR BELT GRINDERS AND THE LIKE

Donald E. Sutton, Kalamazoo, Mich., assignor to Hammond Machinery Builders, Inc., Kalamazoo, Mich., a corporation of Michigan Application April 8, 1946, Serial No. 660,352

13 Claims. (Cl. 51—143)

1

This invention relates to improvements in work tables for belt grinders and the like.

The main objects of this invention are:

First, to provide a work table for belt grinders and the like which is very easily manipulated and effectively presents the work to the grinding belt or other finishing or machine element and one which may be adjusted for very accurate work.

Second, to provide a work table of this character which may be accurately adjusted as to its feed stroke to limit the grinding or machining action on the work.

Third, to provide a structure in which the table is tilted forwardly to receive the work and is swung to horizontal position and advanced to the limit of its feed stroke determined by a control stop by a single stroke or movement on the part of the operator and is returned to retracted and tilted position by a reversal of such stroke.

Objects relating to details and economies of the invention will appear from the description to follow. The invention is defined and pointed out in the claims.

A preferred embodiment of the invention is illustrated in the accompanying drawings, in which:

Fig. 3 is an enlarged view on a line corresponding to line 3—3 of Figs. 4 and 6, the work table being shown in advanced operative relation to the belt by full lines and in retracted position by dotted lines, the belt being indicated by dotted lines.

Fig. 4 is a fragmentary view in section on line 4—4 of Fig. 3.

Fig. 5 is an enlarged fragmentary view showing the relation of the table actuating crank and table bed with the table in retracted position relative to the bed.

Fig. 6 is a fragmentary view in horizontal section on line 6—6 of Fig. 3.

Figure 1:
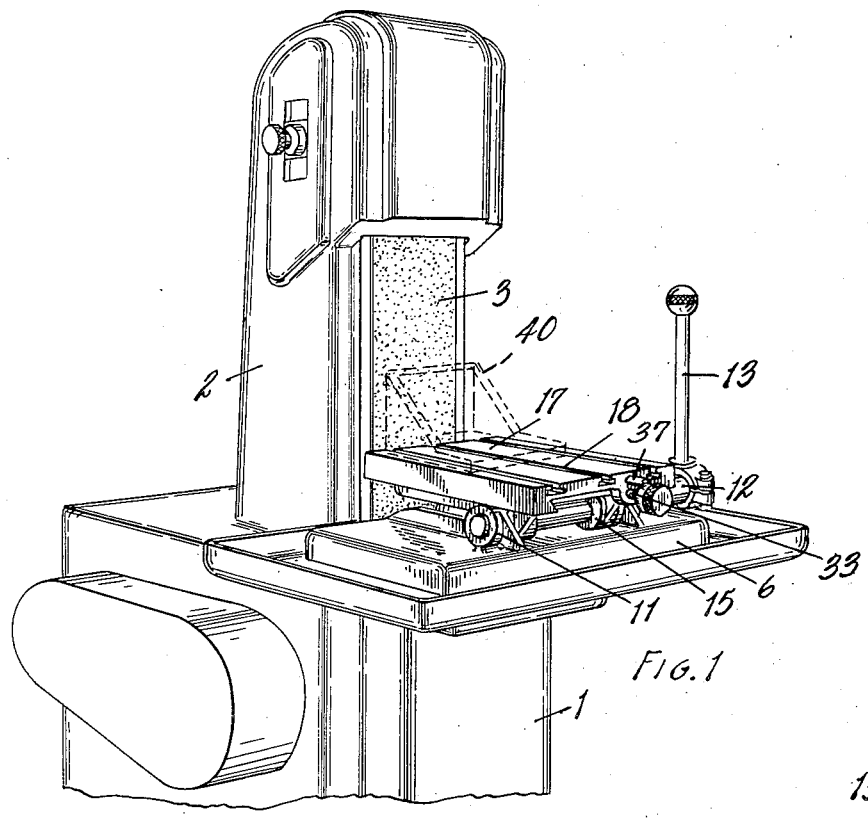
Fig. 1 is a perspective view of a belt grinding machine embodying the invention, parts being shown conventionally and parts broken away, a piece of work being indicated by dotted lines.
Figure 2:
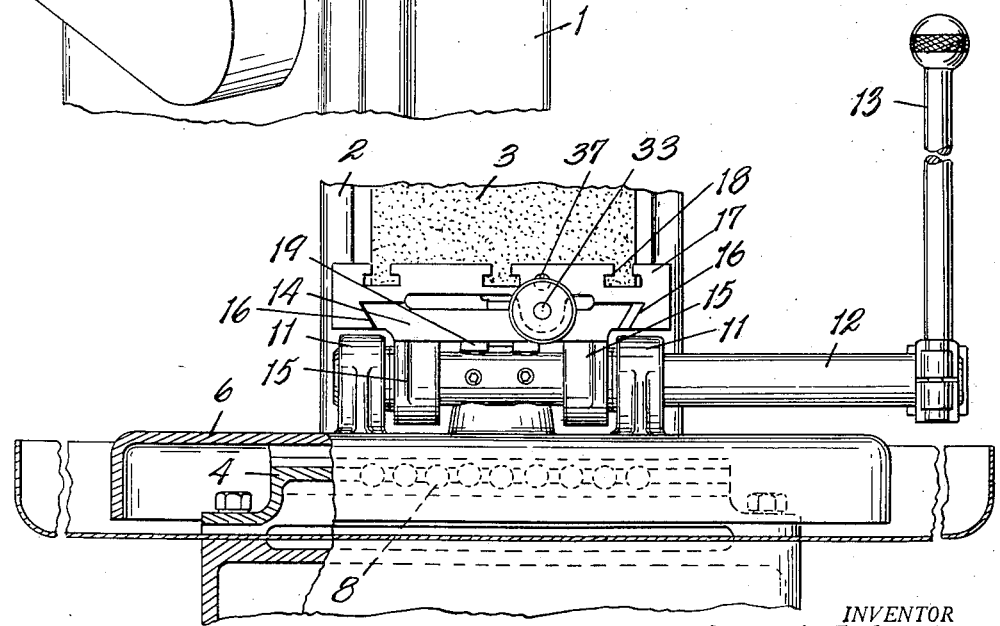
Fig. 2 is an enlarged fragmentary front elevation partially in section.

In the embodiment of the invention illustrated, the grinder pedestal 1 is provided with an upright 2 housing the upper pulley for the grinding belt 3, the lower pulley and driving means being housed in the pedestal. These are not illustrated as they form no part of this invention and suitable driving and supporting means are known in the art.

The pedestal is provided with a carriage way 4 which has oppositely facing ball races 5 disposed

2 in parallel relation to the face of the belt. The carriage 6 is provided with inwardly facing ball races 7 disposed in opposed relation to the ball races 5, the balls 8 coacting with the ball races of the ways and the carriage. The supporting ways and the carriage are provided with ball cage members 9 and 10 coacting with the balls.

The carriage 6 is provided with upwardly projecting lugs 11 rotatably supporting the rockshaft 12 which is provided with an actuating handle or lever 13 at one end thereof preferably the right hand end.

The table bed member 14 is provided with depending ears 15 supportingly and frictionally engaging the shaft 12 so that the table bed member is tilted to and from the position shown by dotted lines in Fig. 3 by the actuation of the rockshaft. The table bed member is provided with slideways 16 for the work holding table 17 which is provided with a plurality of T-slots 18 adapted to receive work supporting lugs not shown. The work table is actuated on these ways by means of the crank arms 19 projecting from the rockshaft and provided with a pin 20 engaging the slotted block 21 on the under side of the table—see Figs. 3 and 4.

As the table is swung to forward or work position it engages the shock absorbing dashpot plunger 22 which is arranged in the dashpot cylinder 23 formed integrally with the table bed member, in the embodiment illustrated. This cylinder is provided with an inlet port 24 provided with a ball return check 25 and with an outlet or bleed port 26 provided with an adjusting valve 27 threaded into the bed member and provided with a lock nut 28 for securing it in its adjusted position.

The plunger is provided with a cupped packing 29 and with a return spring 30.

With the parts thus arranged, the table bed member is mounted for tilting or swinging movement and the work table is mounted thereon for limiting sliding movement to and from the grinding belt, the tilting of the bed member and the sliding movement of the work table being effected through a common means—namely, the lever 13. As the work table is moved rearwardly or toward the belt, the keeper 31 on the under side thereof is engaged with the lock or holder nut 32 on the carriage, see Figs. 3 and 6, the return stroke of the lever first disengaging the locking means through reciprocation of the work table thereby permitting the tilting of the table to the forward position shown by dotted lines.

To limit the feed movement of the table, I provide an adjustable stop screw 33 which is threaded into the nut 34 carried by the work table to coact with the plug-like stop 35 on the table bed. The stop screw is provided with a calibrated head 36 which is knurled to provide a finger piece and suitably calibrated as indicated in Fig. 3, a pointer or index member 37 being mounted on the table to coact therewith. This index finger or pointer is supported in the bore 38 by means of the spring 39 so that the pointer is always in proper position relative to the calibrations of the stop screw throughout its range of adjustment. By adjusting the stop screw, the inward feed of the work table or stroke of the work holder table is limited. A piece of work is indicated at 40 in Fig. 1.

It will be understood that the chucks or holders are suitably positioned on the work table for the particular piece of work so that when the table is swung to the forwardly tilted position shown by dotted lines in Fig. 3, the work may be dropped into the holders and the table swung to the horizontal position and advanced to the work by a single forward continuous movement of the lever 13.

I have illustrated and described the invention in a highly practical embodiment thereof. I have not attempted to illustrate or describe other embodiments or adaptations which may be desirable for particular work or particular types of cutters or tools as it is believed that this disclosure will enable those skilled in the art to embody or adapt the same as may be desired.

Having thus described my invention, what I claim as new and desire to secure by Letters Patent, is:

1. In a grinding machine, the combination with a grinding element, of carriage ways disposed in parallel relation to the face of the grinding element and provided with oppositely facing ball races, a carriage provided with ball races opposed to the ball races of said carriage ways, bearing balls coacting with said races, said ways and carriage being provided with cage members coacting with said balls, a work table bed member, a rockshaft by which said bed member is tiltably supported on said carriage, said bed member being provided with ways disposed transversely of the path of travel of the carriage, a work table slidable in said table ways of said bed member, a crank on said rockshaft for reciprocating the work table in its ways, a table holder member on said carriage, and a coacting keeper member on said table slidably engaged with said holder member to be engaged therewith toward the end of the work stroke of the table and to be disengaged therefrom at the end of the return stroke thereof, a calibrated threadedly adjustable stop member on said work table coacting with said bed member, and a yieldably supported pointer on said table coacting with said adjustable stop member.

2. In a grinding machine, the combination with a grinding element, of carriage ways disposed in parallel relation to the face of the grinding element and provided with oppositely facing ball races, a carriage provided with ball races opposed to the ball races of said carriage ways, bearing balls coacting with said races, said ways and carriage being provided with cage members coacting with said balls, a work table bed member, a rockshaft by which said bed member is tiltably supported on said carriage, said bed member being provided with ways disposed transversely of the path of travel of the carriage, a work table slidable in said table ways of said bed member, a crank on said rockshaft for reciprocating the work table in its ways, a table holder member on said carriage, and a coacting keeper member on said table slidably engaged with said holder member to be engaged therewith toward the end of the work stroke of the table and to be disengaged therefrom at the end of the return stroke thereof.

3. In a grinding machine, the combination with a grinding element, of carriage ways disposed in parallel relation to the face of the grinding element and provided with oppositely facing ball races, a carriage provided with ball races opposed to the ball races of said carriage ways, bearing balls coacting with said races, said ways and carriage being provided with cage members coacting with said balls, a work table bed member, a rockshaft by which said bed member is tiltably supported on said carriage, said bed member being provided with ways disposed transversely of the path of travel of the carriage, a work table slidable in said table ways of said bed member, a crank on said rockshaft for reciprocating the work table in its ways, a calibrated threadedly adjustable stop member on said work table coacting with said bed member, and a yieldably supported pointer on said table coacting with said adjustable stop member.

4. In a grinding machine, the combination with a grinding element, of a carriage mounted to reciprocate across the face of the grinding element, a table bed member, a rockshaft on said carriage by which said bed member is tiltably supported, a dashpot on said carriage comprising a cylinder provided with a return check inlet valve and with an adjustable bleed valve, said bed member being provided with ways disposed transversely of the path of travel of the carriage, a work table slidable in said table ways of said bed member, said work table being engageable in its working position with said dashpot, a crank on said rockshaft for reciprocating the work table in its ways, a holder member on said carriage, and a coacting keeper on said table slidably engageable with said holder member to be engaged therewith toward the end of the work stroke of the table and to be disengaged therefrom at the end of the return stroke thereof, a calibrated adjustable stop member for said work table, and a yieldably supported pointer on said table coacting with said adjustable stop member.

5. In a grinding machine, the combination with a grinding element, of a carriage mounted to reciprocate across the face of the grinding element, a table bed member, a rockshaft on said carriage by which said bed member is tiltably supported, a dashpot on said carriage comprising a cylinder provided with a return check inlet valve and with an adjustable bleed valve, said dashpot being arranged to cushion said table and bed member on said carriage, said bed member being provided with ways disposed transversely of the path of travel of the carriage, a work table slidable in said table ways of said bed member, a crank on said rockshaft for reciprocating the work table in its ways, a holder member on said carriage, and a coacting keeper on said table slidably engageable with said holder member to be engaged therewith toward the end of the work stroke of the table and to be disengaged therefrom at the end of the return stroke thereof, and a calibrated adjustable stop member for said work table.

6. In a grinding machine, the combination with a grinding element, of a carriage mounted to reciprocate across the face of the grinding element, a table bed member, a rockshaft on said carriage by which said bed member is tiltably supported, a dashpot on said carriage comprising a cylinder provided with a return check inlet valve and with an adjustable bleed valve, said bed member being provided with ways disposed transversely of the path of travel of the carriage, a work table slidable in said table ways of said bed member, said work table being engageable with said dashpot to cushion said table and bed member on said carriage, a crank on said rockshaft for reciprocating the work table in its ways, a holder member on said carriage, and a coacting keeper on said table slidably engageable with said holder member to be engaged therewith toward the end of the work stroke of the table and to be disengaged therefrom at the end of the return stroke thereof.

7. In a grinding machine, the combination with a grinding element, of a carriage mounted to reciprocate across the face of the grinding element, a table bed member, a rockshaft on said carriage by which said bed member is tiltably supported, a dashpot on said carriage comprising a cylinder provided with a return check inlet valve and with an adjustable bleed valve, said bed member being provided with ways disposed transversely of the path of travel of the carriage, a work table slidable in said table ways of said bed member, said dashpot being engageable with said work table in the lowered position of said table, a crank on said rockshaft for reciprocating the work table in its ways, a calibrated adjustable stop member for said work table, and a yieldably supported pointer on said table coacting with said adjustable stop member.

8. In a grinding machine, the combination with a grinding element, of a carriage mounted to reciprocate across the face of the grinding element, a table bed member, a rockshaft on said carriage by which said bed member is tiltably supported, a dashpot on said carriage comprising a cylinder provided with a return check inlet valve and with an adjustable bleed valve, a plunger for said dashpot and a return spring for said plunger, said bed member being provided with ways disposed transversely of the path of travel of the carriage, a work table slidable in said table ways of said bed member and engageable with said plunger in the working position of said bed member, a crank on said rockshaft for reciprocating the work table in its ways, a calibrated adjustable stop member for said work table, and a yieldably supported pointer on said table coacting with said adjustable stop member.

9. In a machine of the class described, the combination of a rotatable cutter element, a carriage mounted to reciprocate transversely relative to the path of travel of the cutter element, a table bed member tiltably mounted on said carriage to tilt transversely of the path of travel and to and from the cutter element, a work table slidably mounted on said bed member for movement perpendicularly toward the working portion of the cutter element, means for tilting said bed member on said carriage and reciprocating said table to and from the cutter element, interlocking means on said carriage and table engaged and disengaged by the reciprocating movement of the table for preventing tilting of said bed member in the engaging position of said interlocking means, and an adjustable stop member for said table.

10. In a machine of the class described, the combination of a rotatable cutter element, a carriage mounted to reciprocate transversely relative to the direction of travel of the working portion of the cutter element, a table bed member tiltably mounted on said carriage to tilt transversely of the path of travel and to and from the cutter element, a work table slidably mounted on said bed member for movement perpendicularly toward the working portion of the cutter element, means for tilting said bed member on said carriage and reciprocating said table to and from the cutter element, and interlocking means on said carriage and table engaged and disengaged by the reciprocating movement of the table for preventing tilting of said bed member in the engaged position of said inter-locking means.

11. In a machine of the class described, the combination of a cutter element, a carriage mounted to reciprocate transversely relative to the cutter element, a table bed member tiltably mounted on said carriage to tilt transversely of the path of travel and to and from the cutter element, a dashpot on the carriage coacting with the table bed member as a shock absorber when the bed member is swung to work position, a work table slidably mounted on said bed member for movement toward and from the cutter element, means for tilting said bed member on said carriage and reciprocating said table to and from the cutter element, and an adjustable stop member for said table.

12. In a machine of the class described, the combination with a reciprocatingly mounted carriage, of a work table bed member tiltably mounted on said carriage, a work table slidably mounted on said bed member for movement transversely of the travel of the carriage, a single movement manually operated means for tilting said bed member on its ways and reciprocating said table, an interlocking means on said table and carriage for preventing tilting of said table and disengaged by the reciprocating movement of the table on the bed member, and a calibrated adjustable stop member for said work table.

13. In a machine of the class described, the combination with a reciprocatingly mounted carriage, of a work table bed member tiltably mounted on said carriage, a work table slidably mounted on said bed member for movement transversely of the travel of the carriage, a single movement manually operated means for tilting said bed member on its way and reciprocating said table, and an interlocking means on said table and carriage for preventing tilting of said table and disengaged by the reciprocating movement of the table on the bed member.

DONALD E. SUTTON.

REFERENCES CITED

The following references are of record in the file of this patent:

UNITED STATES PATENTS

| Number | Name | Date |
| --- | --- | --- |
| 1,308,610 | Townsend | July 1, 1919 |
| 2,109,308 | Adams | Feb. 22, 1938 |
| 2,362,873 | Wessman | Nov. 14, 1944 |

FOREIGN PATENTS

| Number | Country | Date |
| --- | --- | --- |
| 558,974 | Great Britain | Jan. 28, 1944 |